INVENTOR.
JAMES H. REYNOLDS
BY
ATTORNEY

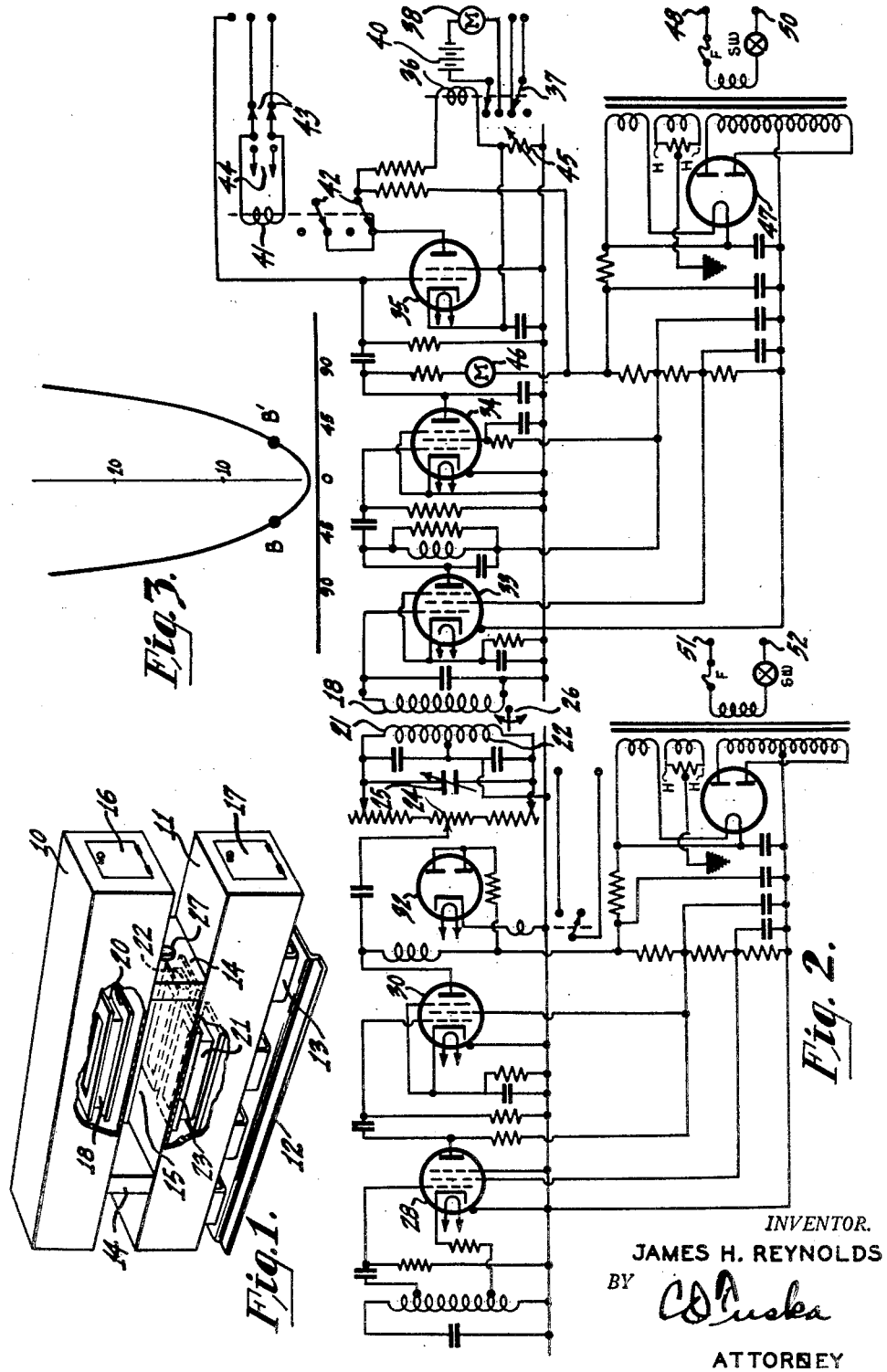

Patented July 4, 1950

2,513,745

UNITED STATES PATENT OFFICE 2,513,745

METAL DETECTOR

James H. Reynolds, Indianapolis, Ind., assignor to Radio Corporation of America, a corporation of Delaware Application December 13, 1944, Serial No. 568,045

9 Claims. (Cl. 175—183)

The present invention relates to inspection apparatus and more particularly to the detection of metal particles in non-metallic material.

Some of the objects of the present invention are: to provide an improved apparatus for the automatic detection of metal particles improperly carried in food products, textiles, plastic molding material, rubber, automobile tires and other materials and products in which the presence of metal particles are deleterious; to provide an inspection apparatus wherein radio frequency oscillations are modulated by the presence of metal particles in a non-metallic material to result in the detection of such particles; to provide a novel dynamic method of detecting metal particles in a non-metallic material; to provide a detector system wherein two coupled circuits are arranged in an unbalanced condition to pass continuously a predetermined voltage to a detector, such voltage being modulated by any metal particle moving in the magnetic field of the coupled circuits and the modulation or signal utilized to actuate an indicator; and to provide other improvements as will hereinafter appear.

Figure 4:
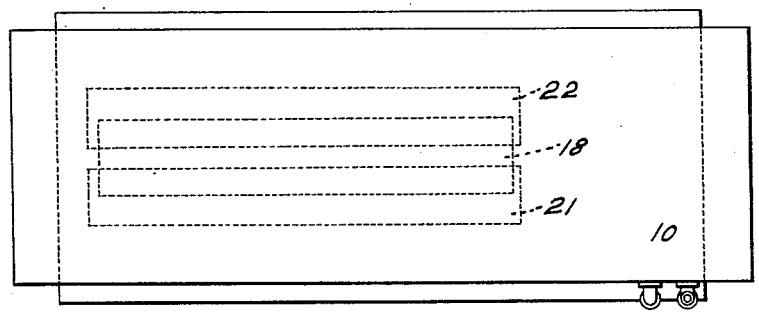
Figure 5:
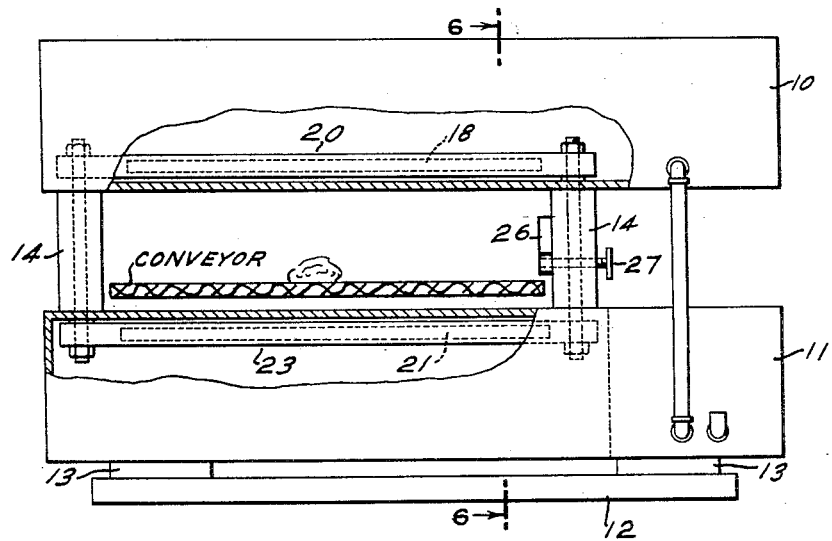
Figure 6:
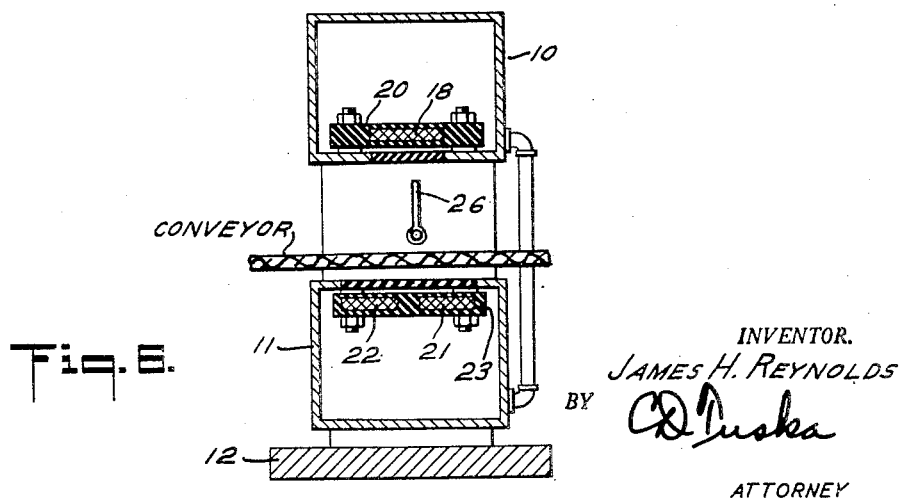

In the accompanying drawings, Fig. 1 represents a perspective of a detecting unit embodying one form of the present invention, the same being partly broken away for better illustration; Fig. 2 represents one form of electrical network embodying the invention; Fig. 3 is a graph of the coil balance curve indicating operating points; Fig. 4 represents a plan of the detecting unit including the networks; Fig. 5 represents a side elevation of the same partially broken away to show the adjusting vane; and Fig. 6 represents a section on line 6—6 of Fig. 5.

Referring to Fig. 1 of the drawing, the metal detector of the present invention is shown as assembled within two superposed inspection heads 10 and 11, preferably of elongated rectangular box form, mounted upon a base 12 with interposed shock mounts 13. The two heads 10 and 11 are spaced apart by two transverse insulating blocks 14 to provide a passage 15 for the material to be inspected. At least one of the blocks includes an aperture for a vane later described. One end of the head 10 is provided with a door 16 for access to the interior where either the detector unit or the oscillator unit, as the case may be, is located. One end of the head 11 is also provided with a door 17 for access to the interior where the unit for coaction with the unit in head 10 is located.

In the present instance, the detector unit is mounted in the head 10. A detector coil 18 is mounted in an insulating mounting block 20 which is located within the head 10. The oscillator unit is, therefore, mounted in the head 11. Two coils 21 and 22 are mounted side by side in the same plane in an insulating mounting block 23. The arrangement is such that the detector coil 18 lies in a plane parallel to and juxtaposed to the coils 21 and 22 for inductive coupling and spaced apart to form a passage 15 through the magnetic field. The coils 18, 21 and 22 are initially arranged in balance by adjusting a rheostat 24, a tuning condenser 25, and a metal vane 26. It should be noted that the coils 21 and 22 are so connected in the circuit of the oscillator unit as to set up opposing fields, while the coil 18 is placed in such relationship to the coils 21 and 22 as to pick up equal voltages from each coil. Preferably the vane 26 is mounted in an aperture in the insulating spacer block 14 and is so placed as to lie either in a plane parallel to the plane of the coil or perpendicular to that plane and is adjustable between these limits. Adjustment of the vane to one or the other of its positions is accomplished by turning a knob 27 conveniently located at the side of the block 14, it being understood that the vane is carried by the shaft of the knob 27, which shaft is journalled in the hollow block 14.

For the purpose of energizing the coils 21 and 22 power is supplied thereto by the oscillator network consisting of a conventional type of master oscillator 29, and amplifier tube 30, the former being preferably of the triple grid type, and the latter preferably a beam power amplifier. In conjunction with the oscillator network, it is desirable to include a rectifier tube 32 with associated switch and relay to power line to serve as an interlock to prevent operation of the equipment until the cathodes of all of the tubes have heated to operating condition.

For indicating the presence of a metal particle in any material traversing the passage 15, the detector unit comprises a network including an RF amplifier 33, a grid leak detector 34 and a gas trigger tube 35, this latter serving when fired to shunt a relay 36 in the plate circuit of the tube 35 thereby to close a switch 37 in a circuit including an indicator, such as a lamp 38, and voltage source 40. It is preferred to have the relay normally energized as this then becomes a fail safe method which will give an indication should the relay coil open up or the supply voltage fail.

One form of reset for recycling purposes comprises a relay 41 which is normally deenergized so that switch 42 closes the plate circuit of the trigger tube 35. After the trigger tube 35 has fired the relay 41 is arranged to be energized by manually throwing the double pole double throw switch 43 to close the relay circuit including a source of voltage 44. The switch 43 can also be arranged for an automatic reset operation as will be understood. When the relay 41 is energized the plate circuit of the trigger tube 35 is momentarily broken. The plate circuit having been momentarily opened, the tube is then ready for the next cycle. It will be understood that the closing of the switch 43 is a momentary operation such as merely pressing a button.

In order to raise or lower the potential on the cathode of the trigger tube 35 to thereby determine the magnitude of the signal required to fire the tube 35, a variable resistance 45 is provided in the cathode circuit and acts as a sensitivity control.

As a balancing indication a meter 46 is provided and located in the plate circuit of the detector tube 34. This thus becomes a visual means of determining the balanced and unbalanced condition of the detector coils. The power supply for the detector network is supplied by the circuit including rectifying tube 47 supplied from line voltage from terminals 48 to 50. Similar terminals 51 and 52 supply power to the oscillator 28.

In the operation of the detector the circuits including the coupled coils 18, 21 and 22 are adjusted by manipulating the potentiometer 24 and associated rheostats, tuning condenser 25 and the vane 26 so that the output voltage to the detector network is zero. The potentiometer 24 is now adjusted to throw the coupled circuits slightly out of balance so that a continuous selected voltage is passed to the detector network. The initial balancing as well as the operating unbalance can be checked by observing the meter 46. Also, by adjusting the variable resistance 45 the magnitude of the signal required to fire the trigger tube 35 can be fixed. If a piece of material containing a metal particle is now caused to travel through the passage 15, it will cause the magnetic field to fluctuate in accordance with the instantaneous position and speed of the particle and an effect similar to a modulated RF carrier is obtained, the voltage being picked up by the coil 18. Leaving the coil 18 the modulated voltage is amplified by the RF amplifier tube 33 and passes to the detector tube 34 where the signal is demodulated and the modulation frequency component amplified and impressed upon the grid of the gas trigger tube 35. This causes the tube 35 to fire, or break down, thereby shunting the relay 36 and causing the indicating circuit to close and the lamp 38 or other indicating means to function. Thus the presence of a metal particle in the material is instantaneously indicated. After the indication the trigger tube 35 is reset by throwing switch 43 to energize the relay 41 to open the switch 42 and thus break the plate circuit of the trigger tube. As soon as this occurs, the switch 43 is again thrown to open position thereby deenergizing the relay 41 and closing the tube plate circuit ready for the next operating cycle.

It should be particularly noted that the apparatus of the invention is dynamic in action since the metal particle must be in motion in order to actuate the trigger tube and the indicator. Moreover, a particle entering the field tends to affect the balance in one sense, while the same particle leaving the field tends to affect the balance in the opposite sense. For example, if a particle entering the field makes for a better balance, the particle leaving the field makes for a poor balance.

By reference to the graph of Fig. 3, it will be noted that the low point indicates the voltage in coil 18 when the best balance is obtained. Now by watching the meter 46 and adjusting the potentiometer 24, the coupled circuits can be unbalanced so as to work at the selected voltage point B or B' on the graph where the best overall sensitivity will be obtained.

It will thus be apparent that a complete unitary metal particle detecting system has been devised wherein the motion of a metal particle moving between the oscillator and detector coils will produce a modulated RF voltage as a signal of the presence of such particle. The impressed signal then serves to fire a gas type trigger tube and thereby produce a visual or audible indication, as the case may be, giving notice of the undesired metal.

In the foregoing specification and in the appended claims, the term "metal particle" is used to indicate that small particles may be detected. It should also be understood that the same device may be used to detect larger objects and, therefore, the term "particle" should not be read in a limited sense. Moreover, while the invention has been described in connection with an indicator, it should be understood that the forces which actuate the indicator may be used to control the mechanism (such as a continuous belt driven by a motor) which passes the particles through the detecting device. The indicator may be provided with a counter whereby the system may be used to count as well as indicate the metal objects which pass through the field.

I claim as my invention:

1. A system for detecting metal particles comprising the combination of an oscillation network including means for producing a magnetic field, a detector network including means responsive to said magnetic field, means for energizing said networks, said field-producing and said field-responsive means being adjusted in the absence of a particle to pass a predetermined voltage to said detector network, an indicator, and means in said detector network, responsive only to a signal impressed on said predetermined voltage by a metal particle moving to cause fluctuations of said magnetic field, to actuate said indicator.

2. A system for detecting metal particles comprising the combination of an oscillation network including means for producing a magnetic field, a detector network including means responsive to said magnetic field, means for energizing said networks, said networks being in such spaced relation as to form a passageway for said particles through the magnetic field, means to adjust said networks in the absence of a particle to pass a predetermined voltage to said detector network, an indicator, and means in said detector network responsive only to the variation of said magnetic field produced by the movement of a metal particle through said passageway for actuating said indicator.

3. A system for detecting metal particles comprising the combination of an oscillation network including means for producing a magnetic field, a detector network including means responsive to said magnetic field, sources of voltage for respectively energizing said networks, said field-producing and field-responsive means in said networks being coupled in such spaced relation as to form a passageway for said particles through the magnetic field, an indicator, means to balance the coupling of said networks to zero output in the absence of a particle, supplemental means to unbalance the coupling of said networks to pass a predetermined voltage to said detector network in the absence of a particle, an indicator, and means in said detector network responsive only to modulations impressed on said predetermined voltage by a metal particle moving in said passageway for actuating said indicator.

4. A system for detecting metal particles comprising the combination of an oscillation network, a detector network, sources of voltage for respectively energizing said networks, means for inductively coupling said networks in such spaced relation as to form a passageway through the magnetic field of said coupling means, means to balance said coupling means to zero output, a metal vane adjustably located in said magnetic field and cooperative therewith to adjust said balanced coupling means, said vane being positioned to cause predetermined voltage to pass to said detector network in the absence of a particle, an indicator, and means in said detector network responsive only to modulations impressed on said predetermined voltage by a metal particle moving in said passageway for actuating said indicator.

5. A system for detecting metal particles comprising the combination of an oscillation network, a detector network, sources of voltage for respectively energizing said network, means for inductively coupling said networks in such spaced relation as to form a passageway through the magnetic field of said coupling means, means to adjust said coupling means, said last named means being adjusted to cause a predetermined voltage to pass to said detector network in the absence of a particle, an indicator, means in said network for demodulating a signal impressed on said predetermined voltage by the movement of a metal particle through said passageway, and means responsive to the demodulated signal for actuating said indicator.

6. A system for detecting metal particles comprising the combination of an oscillation network, a detector network, sources of voltage for respectively energizing said networks, means for inductively coupling said networks in such spaced relation as to form a passageway through the magnetic field of said coupling means, means to adjust said coupling means, said last named means being adjusted to cause a predetermined voltage to pass to said detector network in the absence of a particle, an indicator, means in said network for demodulating a signal impressed on said predetermined voltage by the movement of a metal particle through said passageway, and means including a trigger tube responsive to the demodulated signal for actuating said indicator.

7. A metal detecting apparatus comprising the combination of two box-like heads arranged in the same plane, insulating blocks spacing said heads and forming a passage between said heads, an oscillation network in one head, a detector network in the other head, sources of voltage respectively energizing said networks, said oscillation network having two coils arranged in side to side relation and connected to set up opposing fields, said detector network having a coil, said two coils and coil being separated by said passage and inductively coupled to produce a magnetic field in said passage, means for adjusting said two coils and coil to pass a predetermined voltage to said detector network, an indicator, and means in said detector network, responsive only to a signal impressed on said predetermined voltage by a metal particle moving to cause fluctuations of said magnetic field, to actuate said indicator.

8. A device responsive to the movement of a metal object comprising an oscillation network including means for producing a high frequency magnetic field, a detector network including means responsive to said magnetic field, said field-producing and field-responsive means being adjusted to produce a predetermined voltage in said detector network, said detector network also including a grid-leak detector tube, and an indicator coupled to said detector tube and responsive only to a signal produced by the movement of said object through said field.

9. A device responsive to the movement of a metal object comprising two box-like heads held in fixed, spaced, parallel relation to form a passageway between said heads, an oscillation network in one head, a detector network in the other head, one of said networks including two coils arranged side by side and the other network including a single coil, the axes of said coils being normal to the adjacent surfaces of the respective heads in which they are located, said single coil being substantially equidistant from each of said two coils an in inductively coupled relation therewith, said coils and networks being so constructed and arranged that oscillatory energy is transferred from said oscillation network to said detector network by means of a magnetic field coupling said single coil with one of said pair of coils in such phase as to oppose the energy transferred by means of a magnetic field coupling said single coil with the other one of said pair of coils, means for adjusting the relative transfer of energy between said single coils and said pair of coils, said means being adjusted in the absence of a metal particle to produce a voltage in said detector network having a predetermined finite value, a detector tube in said detector network for producing a modulation frequency voltage corresponding to variations in said magnetic field produced by the movement of a metal particle through said field and an indicator responsive only to said modulation-frequency voltage.

JAMES H. REYNOLDS.

REFERENCES CITED

The following references are of record in the file of this patent:

UNITED STATES PATENTS

| Number | Name | Date |
|---|---|---|
| Re. 21,003 | Knerr et al. | Feb. 14, 1939 |
| 1,792,249 | Serduke | Feb. 10, 1931 |
| 2,057,835 | Karajan et al. | Oct. 20, 1936 |
| 2,087,783 | Savage | July 20, 1937 |
| 2,102,450 | Zuschlag | Dec. 14, 1937 |
| 2,147,746 | Luck et al. | Feb. 21, 1939 |
| 2,155,267 | Hathaway | Apr. 18, 1939 |
| 2,189,092 | Urmenyi | Feb. 6, 1940 |
| 2,237,254 | Broekhuysen | Apr. 1, 1941 |
| 2,315,045 | Breitenstein | Mar. 30, 1943 |
| 2,377,363 | Noble et al. | June 5, 1945 |